United States Patent [19]

Schmitt

[11] Patent Number: 4,678,948
[45] Date of Patent: Jul. 7, 1987

[54] MEASURING DEVICE ERROR MONITORING SYSTEM

[75] Inventor: Walter Schmitt, Traunreut, Fed. Rep. of Germany

[73] Assignee: Dr. Johannes Heidenhain GmbH, Traunreut, Fed. Rep. of Germany

[21] Appl. No.: 613,508

[22] Filed: May 23, 1984

[30] Foreign Application Priority Data

Jun. 28, 1983 [DE] Fed. Rep. of Germany ....... 3323281

[51] Int. Cl.⁴ ..................... H03K 1/00; G01B 11/14
[52] U.S. Cl. .................................. 307/511; 307/479; 307/262; 356/374; 250/237 G; 33/125 A
[58] Field of Search ............... 307/510, 511, 479, 262, 307/471; 356/374; 250/237 G; 33/125 A

[56] References Cited

U.S. PATENT DOCUMENTS 3,849,671 11/1974 Molack ................................ 307/262
3,902,126 8/1975 Sassler ................................... 328/61

FOREIGN PATENT DOCUMENTS 2022151 6/1978 Fed. Rep. of Germany .

*Primary Examiner*—Stanley D. Miller
*Assistant Examiner*—Richard Roseen
*Attorney, Agent, or Firm*—Willian Brinks Olds Hofer Gilson & Lione Ltd.

[57] ABSTRACT

A system for error monitoring in a photoelectric incremental length measuring device for the measurement of the relative position of two objects is described. The measuring device generates at least one measuring signal obtained during the scanning of a scale by means of a scanning unit. This signal is fed simultaneously to an evaluating unit and to an error monitoring unit. In the event of faulty signal parameters of the measuring signal, the error monitoring unit generates an error signal. The measuring signal is applied to an inverter and to a first AND gate. The output of the inverter is applied to a second AND gate. The two AND gates also receive the error signal as a second input. This error signal brings about an in-phase switching of the output signals of the two AND gates. The in-phase state of the signals generated by the AND gates is detected by a phase discriminator of an external evaluating unit, which generates an error signal on a respective line.

6 Claims, 4 Drawing Figures

| a | b | c | d |
|---|---|---|---|
| 0 | 1 | 0 | 1 |
| 1 | 1 | 1 | 0 |
| 0 | 0 | 0 | 0 |
| 1 | 0 | 0 | 0 |

| a | b | c | d |
|---|---|---|---|
| 0 | 1 | 0 | 1 |
| 1 | 1 | 1 | 0 |
| 0 | 0 | 0 | 0 |
| 1 | 0 | 1 | 1 |

MEASURING DEVICE ERROR MONITORING SYSTEM

BACKGROUND OF THE INVENTION

The present invention relates to a system for monitoring errors in a measuring device for measuring the relative position of two objects, of the type comprising a scale, a scanning unit which generates at least one measuring signal in response to the scanning of the scale, an evaluating unit which evaluates the measuring signal, and means for generating an error signal in response to selected parameters of the at least one measuring signal.

German Patent DE-PS No. 20 22 151 discloses a method for avoiding errors in an incremental measuring device for measuring the relative position of two objects. In the disclosed system, phase-displaced scanning signals obtained in the scanning of a scale by means of a scanning unit are fed simultaneously to an evaluating unit and to an error monitoring unit. This error monitoring unit monitors the phase angle and the amplitude level of the scanning signals. In the event of faulty signal parameters of the scanning signals, for example as a result of optical fouling, aging or wear of the measuring system, this error monitoring unit generates an error signal which is conducted via a separate line to a warning lamp, which can be provided in the evaluating-and-display unit.

In addition, it is a known practice in such an incremental measuring device for an error monitoring system to switch the scanning signals and their inverted signals into a high resistance state during the time of the disturbance as indicated by the error signal. In this way, the disturbance appears as a line break to the evaluating unit. This approach to error signal transmission has the advantage that no separate transfer line is required for the error signal. It presents this advantage that the recognition of the high-resistance state can occur only relatively slowly because of line capacitance, especially in the case of great lengths of the transmission lines. This is because no driver function is provided for the charge reversal.

SUMMARY OF THE INVENTION

The present invention is directed to an improved process for error monitoring in a measuring system, which permits a lag-free recognition of an error state in a particularly simple and trouble-free manner, without a separate transmission line for the error signal.

According to this invention, a measuring system of the type described initially above is provided with means for generating an inverted signal, opposite in phase to the measuring signal being measured. Means are included in the evaluating unit for sensing the phase relationship between the measuring signal and the inverted signal, and means are provided for setting the phase difference between the measuring signal and the inverted signal to zero when the error signal is present.

The present invention provides the important advantage that no separate transmsision line is required for the error signal. When such a separate transmission line is used, an error state cannot be recognized in the event the line is broken or otherwise interrupted. In a preferred embodiment described below an error state is signaled to the evaluating unit, and yet usable scanning signals are simultaneously provided to the evaluating unit, so that the measuring process does not need to be interrupted. Further advantageous features of the invention are set forth in the dependent claims.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
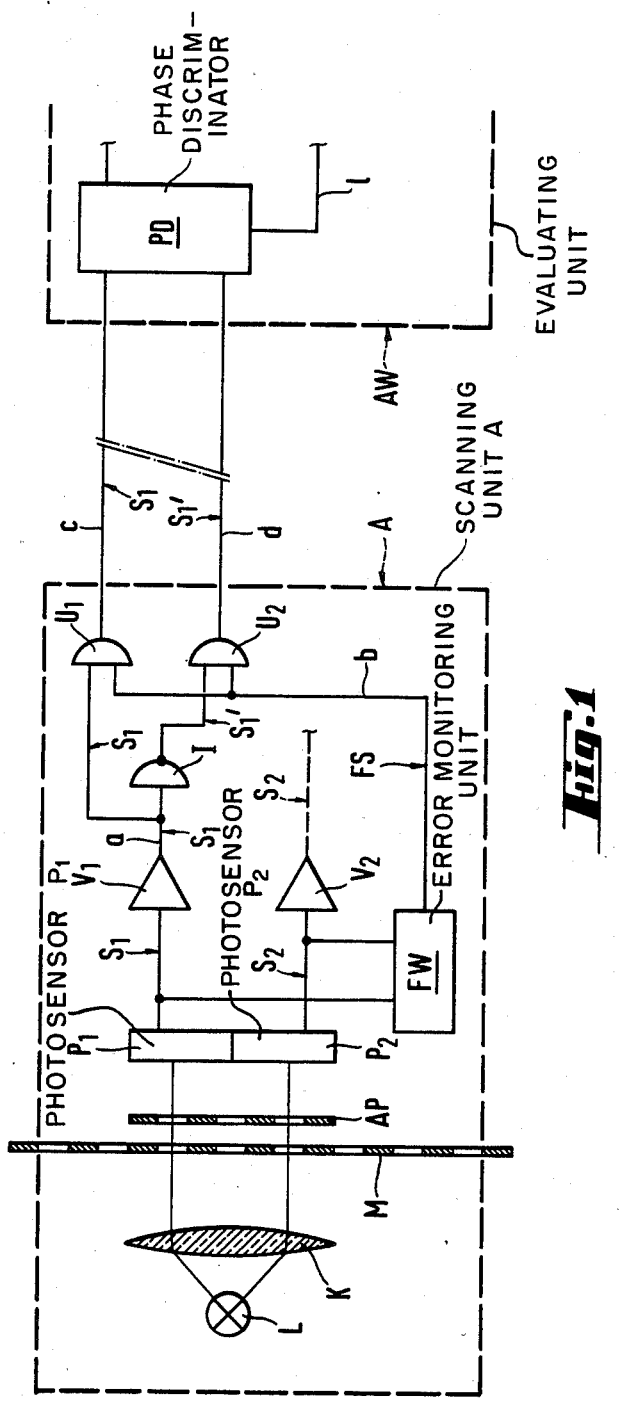
FIG. 1 is a schematic diagram of a first preferred embodiment of the present invention.

Turning now to the drawings, FIG. 1 schematically represents a photoelectric incremental length measuring device having a measuring scale M and a scanning unit A. The scale M and the scanning unit A are connected (in a manner not shown) in each case with a respective one of two objects, the position of which is to be measured. For example, the scale M and the scanning unit A can be connected to two machine parts of a processing machine. The scanning unit A includes for the scanning of the graduation of the scale M a scanning plate AP having a graduation identical to that of the measuring scale M and fixedly mounted to the scanning unit A. A lamp L is provided which generates light that passes through a condenser lens K, through the graduations of the scale M and the scanning plate AP, and impinges on two photosensors $P_1$, $P_2$. Movement of the scale M relative to the scanning plate AP causes a modulation of the light flux falling on the photosensors $P_1$, $P_2$. The photosensors $P_1$, $P_2$ generate periodic electric analog measuring signals $S_1$, $S_2$ in response to this modulated light flux. The signals $S_1$, $S_2$ are amplified in amplifiers $V_1$, $V_2$ respectively. The amplified signal $S_1$ is applied to an inverter J as well as to the first input of a first AND gate $U_1$. The inverter J generates an inverted counterphase signal $S_1'$ which is applied to a first input of a second AND gate $U_2$. The output signal $S_1$ of the AND gate $U_1$ is applied via a line c, and the inverted output signal $S_1'$ of the AND gate $U_2$ is applied via a line d to a phase discriminator PD of an external evaluating unit AW. In a similar manner, the output signal $S_2$ of the amplifier $V_2$ can be applied to a similar set of inverter and AND gates (not shown).

The analog signals $S_1$, $S_2$ on the output of the photosensors $P_1$, $P_2$ are supplied simultaneously to an error monitoring unit FW for the monitoring for example of the reciprocal phase position and the amplitude level of the analog signals $S_1$, $S_2$. A suitable error monitoring unit is described for example in German Patent DE-PS No. 20 22 151. In the event of faulty signal parameters of the analog signals $S_1$, $S_2$, the error monitoring unit FW generates an error signal FS which is applied to second inputs of the AND gates $U_1$, $U_2$. This error signal brings about an in-phase switching of the signals $S_1$, $S_1'$ on the outputs of the AND gates $U_1$, $U_2$. The phase discriminator PD detects the in-phase state of the signals $S_1$, $S_1'$ and generates an error signal via the line l in the evaluating unit AW. It should be appreciated that in normal operation (when the error signal FS is absent) the signals $S_1$, $S_1'$ are in phase opposition, and the error signal on line 1 is therefore not generated.

Figures 2, 3, 4:
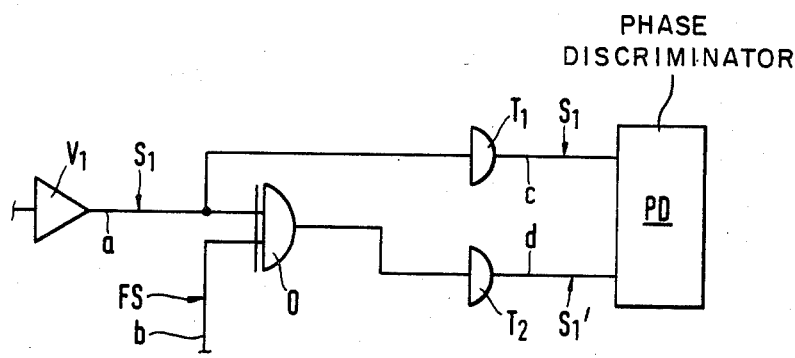
FIG. 2 is a logical function table of signals generated by the embodiment of FIG. 1.
FIG. 3 is an electrical schematic diagram of portions of a second preferred embodiment of this invention.
FIG. 4 is a logical function table of signals generated by the embodiment of FIG. 3.

FIG. 2 represents a logical function table of signals $S_1$, FS, $S_1$, $S_1'$ on the lines a-d of FIG. 1. In a similar manner which is not shown in FIG. 1 the analog signal $S_2$ can be used to generate a signal $S_2'$ which is a counterphase signal during normal operation and which is switched in phase with the analog signal $S_2$ by the error signal FS in the event of an error. The signals $S_2$, $S_2'$ can be evaluated in a similar manner to that described above by the phase discriminator PD. In addition, the signals $S_2$, $S_2'$ can be switched by a second error signal of a second error monitoring unit so that various errors can be monitored and recognized separately.

FIG. 3 represents a second preferred embodiment in which the signal $S_1$ on the output of the amplifier $V_1$ and the error signal FS of FIG. 1 act in each case on respective inputs of an exclusive OR gate O. The signal $S_1$ and the output signal $S_1'$ of the exclusive OR gate O are applied to respective driver stages $T_1$, $T_2$. The output signals $S_1$, $S_1'$ of these driver stages $T_1$, $T_2$ are conducted via lines c, d to the phase discriminator PD of FIG. 1 for evaluation. The driver stages $T_1$, $T_2$ can be dispensed with in alternative embodiments. FIG. 4 represents a logical function table of the signals $S_1$, FS, $S_1$, $S_1'$ on the lines a-d of FIG. 3. In the event of a disturbance, the error signal FS brings about an in-phase switching of the measuring signals $S_1$, $S_1'$ on the lines c, d, which is detected by the phase discriminator PD to detect the error condition. It is evident from the logical function table of FIG. 4 that despite the error condition, usable signals $S_1$, $S_1'$ are present, so that the measuring process does not need to be interrupted during the error condition.

The logical gates $U_1$, $U_2$, O, as well as the driver stages $T_1$, $T_2$ can also be constructed monolithically. Of course, it should be understood that a wide range of changes and modifications can be made to the preferred embodiments described above. For example, the error monitoring system of this invention is well suited for use in magnetic, inductive, and capacitive measuring systems, as well as in the optical measuring system shown. It is therefore intended that the foregoing detailed description be regarded as illustrative rather than limiting, and that it be understood that it is the following claims, including all equivalents, which are intended to define the scope of this invention.

I claim:

1. In a measuring system for measuring the relative position of two objects, of the type comprising a scale and a scanning unit wherein relative movement of the two objects causes the scanning unit to scan the scale to produce at least one measuring signal indicative of the relative movement of the two objects, said at least one measuring signal comprising a first measuring signal, the system further comprising an evaluating unit which evaluates the at least one measuring signal, means for detecting errors in the at least one measuring signal, and means for generating an error signal in response to the detected errors, the improvement comprising:

means for generating an inverted signal, opposite in phase to the first measuring signal;

means, responsive to the error signal, for setting the phase difference between the first measuring signal and the inverted signal to zero when the error signal is present; and means, included in the evaluating unit, for sensing the phase difference between the first measuring signal and the inverted signal and for generating an indicator signal which defines an error condition when the sensed phase difference is equal to zero and defines a non-error condition when the sensed phase difference is not equal to zero.

2. The invention of claim 1 wherein the setting means comprises at least one logical gate.

3. The invention of claim 2 wherein the at least one logical gate comprises first and second AND gates, coupled to gate the at least one measuring signal and the inverted signal, respectively, in response to the error signal.

4. The invention of claim 2 wherein the at least one logical gate comprises an exclusive OR gate coupled to gate one of the at least one measuring signal and the inverted signal in response to the error signal.

5. In a measuring system for measuring the relative position of two objects, of the type comprising a scale and a scanning unit wherein relative movement of the two objects causes the scanning unit to scan the scale to produce at least one measuring signal indicative of the relative movement of the two objects, the system further comprising an evaluating unit which evaluates the at least one measuring signal, means for detecting errors in the at least one measuring signal, and means for generating an error signal in response to the detected errors, the improvement comprising:

means for generating an inverted signal, opposite in phase to the measuring signal;

a first AND gate having a first input coupled to receive the measuring signal, a second input coupled to receive the error signal, and a first output which carries a gated measuring signal;

a second AND gate having a first input coupled to receive the inverted signal, a second input coupled to receive the error signal, and a first output which carries a gated inverted signal;

means, included in the evaluating unit and coupled to the first outputs of the first and second AND gates, for generating a first signal when the gated measuring signal is in phase with the gated inverted signal;

said error signal generating means, inverted signal generating means, and first and second AND gates cooperating to insure that the measuring signal and the inverted signal are out of phase when the error signal is absent and are in phase when the error signal is present.

6. In a measuring system for measuring the relative position of two objects, of the type comprising a scale and a scanning unit wherein relative movement of the two objects causes the scanning unit to scan the scale to produce at least one measuring signal indicative of the relative movement of the two objects, the system further comprising an evaluating unit which evaluates the at least one measuring signal, means for detecting errors in the at least one measuring signal, and means for generating an error signal in response to the detected errors, the improvement comprising:

an exclusive OR gate having a first input coupled to receive the measuring signal, a second input coupled to receive the error signal and an output coupled to carry a first signal to the evaluating unit;

means, included in the evaluating unit, for sensing the phase relationship between the measuring signal and the first signal, and for generating a second signal when the measuring signal and the first signal are in phase;

said error signal generating means and exclusive OR gate cooperating to ensure that the measuring signal and the first signal are out of phase when the error signal is absent and in phase when the error signal is present.

* * * * *